(12) United States Patent  
Nabeshima

(10) Patent No.: US 6,999,197 B1  
(45) Date of Patent: Feb. 14, 2006

(54) BLACK EDGE DETERMINATION METHOD AND DEVICE

(75) Inventor: Takayuki Nabeshima, Toyokawa (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/526,878

(22) Filed: Mar. 16, 2000

(30) Foreign Application Priority Data

Mar. 19, 1999 (JP) .................................. 11-074835

(51) Int. Cl.
  G06F 15/00 (2006.01)
  G03F 3/08 (2006.01)
  H04N 1/40 (2006.01)
  G06K 9/00 (2006.01)
  G06K 9/36 (2006.01)

(52) U.S. Cl. ........................ 358/1.9; 358/520; 358/462; 382/162; 382/166; 382/167

(58) Field of Classification Search ................ 358/1.9, 358/520, 462, 296, 464, 538, 2.1, 3.27, 453; 345/595, 581, 618; 382/103, 173, 167, 194, 382/199, 228, 205, 218, 266, 274, 284, 166, 382/165, 191, 162

See application file for complete search history.

(56) References Cited

U.S. PATENT DOCUMENTS

| | | | | |
|---|---|---|---|---|
| 5,296,939 A | * | 3/1994 | Suzuki ........................ | 358/453 |
| 5,588,069 A | * | 12/1996 | Katayama et al. .......... | 382/166 |
| 5,751,847 A | * | 5/1998 | Wuyts ........................ | 382/165 |
| 5,850,293 A | | 12/1998 | Suzuki et al. ............... | 358/298 |
| 5,905,579 A | * | 5/1999 | Katayama et al. .......... | 358/296 |

FOREIGN PATENT DOCUMENTS

JP  08-116462  5/1996

* cited by examiner

*Primary Examiner*—Kimberly Williams  
*Assistant Examiner*—Thomas J. Lett  
(74) *Attorney, Agent, or Firm*—Buchanan Ingersoll PC

(57) ABSTRACT

Black edge identification may be accurately performed using hue information or its equivalent in addition to the brightness information and saturation information used in the conventional method. The device that identifies black edges obtains the brightness information, saturation information and hue information regarding the edges to determine, based on the brightness information and the saturation information, whether or not the edges are black edges, and to determine, based on the hue information, whether or not the edges are pseudo-black edges. Where the edges are identified as black edges and not as pseudo-black edges, it is determined that the edges are black edges.

6 Claims, 9 Drawing Sheets

BLACK EDGE DETERMINATION METHOD AND DEVICE

RELATED APPLICATION

This application is based on application No. 11-74835 filed in Japan, the entire content of which is hereby incorporated by reference.

BACKGROUND OF THE INVENTION

1. Field of the Invention

The present invention pertains to a method and device to determine whether or not edges of the image of an original document read by an image sensor are black edges in an image processing device mounted in a color copying machine, etc., as well as to an image processing device using said identifying method and device.

2. Description of the Related Art

In conventional image processing devices, in order to improve the reproduction quality of black characters or black lines (line drawings) included in the color image of an original document read by the image sensor, the edges of the black characters or black lines (hereinafter collectively called 'black characters') in the image are generally identified, so that image processing such as edge enhancement may be performed based on the results of the identification. This image processing is briefly explained below.

First, the edges of the image are identified by filtering, using a primary differential filter and a secondary differential filter, the input image signals obtained through the reading of the original document, and if the saturation is lower than the threshold value, which is set in accordance with the brightness information of the input image signals, the image is identified as a black character. Based on these determination results, black edges (any area that comprises an edge and is part of a black character) are identified. Whether the area is outside the edges (the background side) or inside the edges (on the black line) may be determined based on whether the output of the secondary differential filter is positive or negative. In the explanations that follow, the outside area of a black edge will be called the black outer edge area, and the inside area of a black edge will be called the black interior edge area.

In order to improve the reproduction quality of black characters or black lines, the following processing is carried out regarding the black interior edge area and black outer edge area. For the pixels in a black interior edge area, the edge enhancement process is performed, wherein a brightness component is added to the black image data K. For color image data C (cyan), M (magenta) and Y (yellow), no edge enhancement is carried out, and processing is performed in which the image data for the target pixel is replaced with pixel data having the smallest value in a 5×5 or 3×3 pixel matrix (in other words, the pixel data having the lowest darkness level).

For pixels in black outer edge areas, edge enhancement is not performed to either the black or color image data K, C, M or Y, and processing is performed in which the image data for the target pixel is replaced with the pixel data having the smallest value in a 5×5 or 3×3 pixel matrix.

Using such processing, C, M and Y color components are reduced near the edges of a black character or black line in the image of an original document while the black interior edge areas are enhanced, resulting in improved reproducibility of black characters or black lines.

As described above, determination as to whether or not edges are black edges has conventionally been made based on a comparison of the saturation information with a threshold value obtained based on the brightness value. Where the saturation is smaller than the threshold value, the image may be deemed to be a black character. However, it is empirically known that the higher the brightness, the higher the required threshold values are.

In addition, a determination method disclosed in Japanese Laid-Open Patent Application No. Hei 8-116462 is also proposed in order to increase the accuracy of black character identification. In this method, a second black character identifying unit is used in addition to the identifying method described above (the first black character identifying unit). While the first black character identifying unit identifies black characters based on the brightness information and saturation information obtained from the brightness/chromaticity Lab space, the second black character identifying unit identifies black characters using the black signals (K) and saturation signals obtained from the YMC color space. A black character is identified only when both the first and second black character identifying units output a black character identification signal.

However, in the conventional method described above, when the balance among the three primary colors (R, G, B) is compromised due to aberrations in the optical system or the line-to-line correction, performing accurate black character identification becomes difficult.

In the identifying method disclosed in Japanese Laid-Open Patent Application No. Hei 8-116462, where color balance is compromised due to signal processing such as line-to-line correction, the identification accuracy will be improved. However, because the YMC color signals, which are the source of the black signals (K) and saturation signals input to the second black character identifying unit, are signals obtained by converting the Lab space signals, where the color balance, which comprises the Lab space signals themselves, is compromised due to aberrations in the optical system, no improvement in identification accuracy can be expected.

SUMMARY OF THE INVENTION

The object of the present invention is to resolve the problems identified above.

Another object of the present invention is to provide a method and device to accurately identify black edges.

Yet another object of the present invention is to provide a black edge identifying method and device in which the accuracy of identification is improved by using the hue information or its equivalent in addition to the brightness information and saturation information, which are conventionally used in black character (black edges) identification, as well to provide as an image processing device using said method and device.

These and other objects are attained by a determining method having the steps of receiving image data which is obtained by means of reading an original document by an image sensor; extracting an edge portion using the received image data; obtaining brightness information, saturation information and hue information with respect to the edge portion; and determining whether or not the edge portion is black edge based on the brightness information, saturation information and hue information.

The aforementioned objects are also attained by an image processing apparatus having a receiver which receives image data which is obtained by means of reading an original document by an image sensor, an extracting portion which extracts an edge portion using the received image data, an obtaining portion which obtains brightness information, saturation information and hue information with respect to the edge portion, a first determining portion which determines whether or not the edge portion is black edge based on the brightness information and saturation information, a second determining portion which determines whether or not the edge portion is a pseudo-black edge based on the hue information, and a third determining portion which determines that the edge portion is a black edge when the edge is determined as a black edge by the first determining portion and not as a pseudo-black edge by the second determining portion.

The invention itself, together with further objects and attendant advantages, will best be understood by reference to the following detailed description taken in conjunction with the accompanying drawings.

BRIEF DESCRIPTION OF THE DRAWINGS

In the following description, like parts are designated by like reference numbers throughout the several drawings.

DESCRIPTION OF THE PREFERRED EMBODIMENT

An embodiment of the present invention is explained below.

Figure 14:
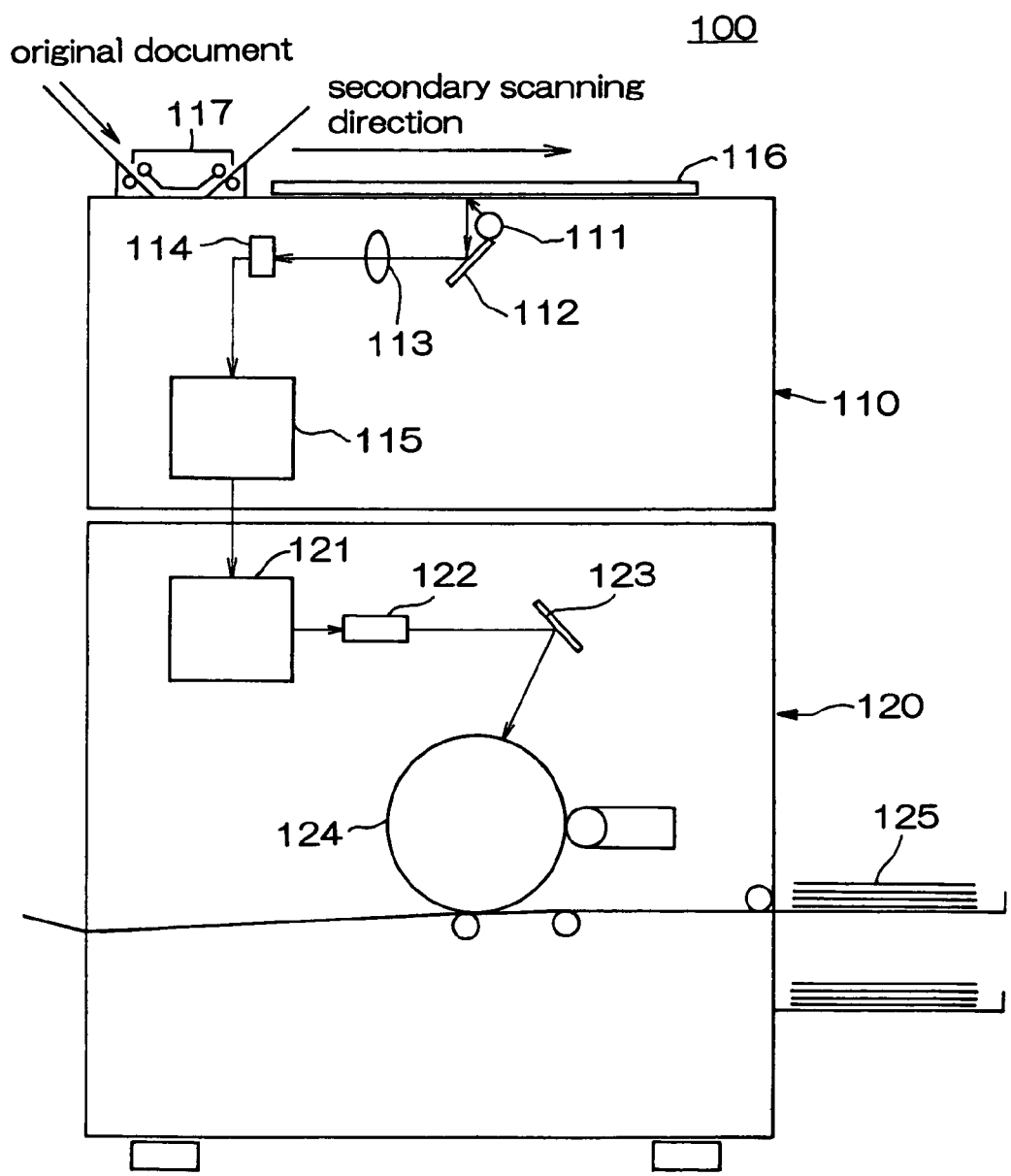
FIG. 14 is a drawing showing the basic construction of a digital color copying machine.

FIG. 14 shows the basic construction of a digital color copying machine in which the black edge identifying method and device are applied.

In FIG. 14, the digital color copying machine 100 consists of an image reading device 110, which comprises the upper half of the machine, and an image recording device 120, which comprises the lower half of the machine. The image reading device 110 includes a manually placed document reader 116 and a continuous document feeder 117.

The image reading device 110 irradiates light from the light source 111 onto the original document and causes the light reflected from the document surface to form an image on the CCD 114, which is a linear image sensor, via the reduction optical system that includes a mirror 112 and the lens 113. The CCD 114 converts the image of the original document into analog signals based on photoelectric conversion and charge transfer. For example, the resolution of the CCD 114 is 400 dpi and the maximum document size is A3. In this case, one line in the main scanning direction comprises approximately 5,000 dots.

The analog signals output from the CCD 114 are sent to the image processing device 115. The image processing device 115 converts the analog signals into digital data and performs such image processing as magnification change and image quality correction. The post-processing digital data is output from the image reading device 110 as digital image data.

Scanning to perform reading of the original document is carried out with the direction of scanning by the elements comprising the CCD 114 (along the length of the CCD 114) as the main scanning direction and the direction perpendicular to the main scanning direction as the secondary scanning direction. Scanning in the secondary scanning direction is carried out by means of horizontally moving the mirror 12 when the original document is placed manually and by means of conveying the original document when the continuous feeder is used. In either case, image signals are sequentially transferred on a line-by-line basis in the main scanning direction.

The image recording device 120 converts the digital image data output from the image reading device 110 into analog signals by means of the laser diode drive unit 121 and then into light by means of the laser diode 122. The light is then caused to form an image on the photoreceptor drum 124 by means of the polygon mirror 123. The electric current input to the laser diode 122 is controlled such that the projected light amount is controlled for each pixel. Consequently, a latent image is formed on the photoreceptor drum 124, this image is developed using toner, and it is then transferred onto a recording sheet 125. In this way, a 400 dpi and 256 gradation-level image is formed using the electrophotographic method.

Figure 1:
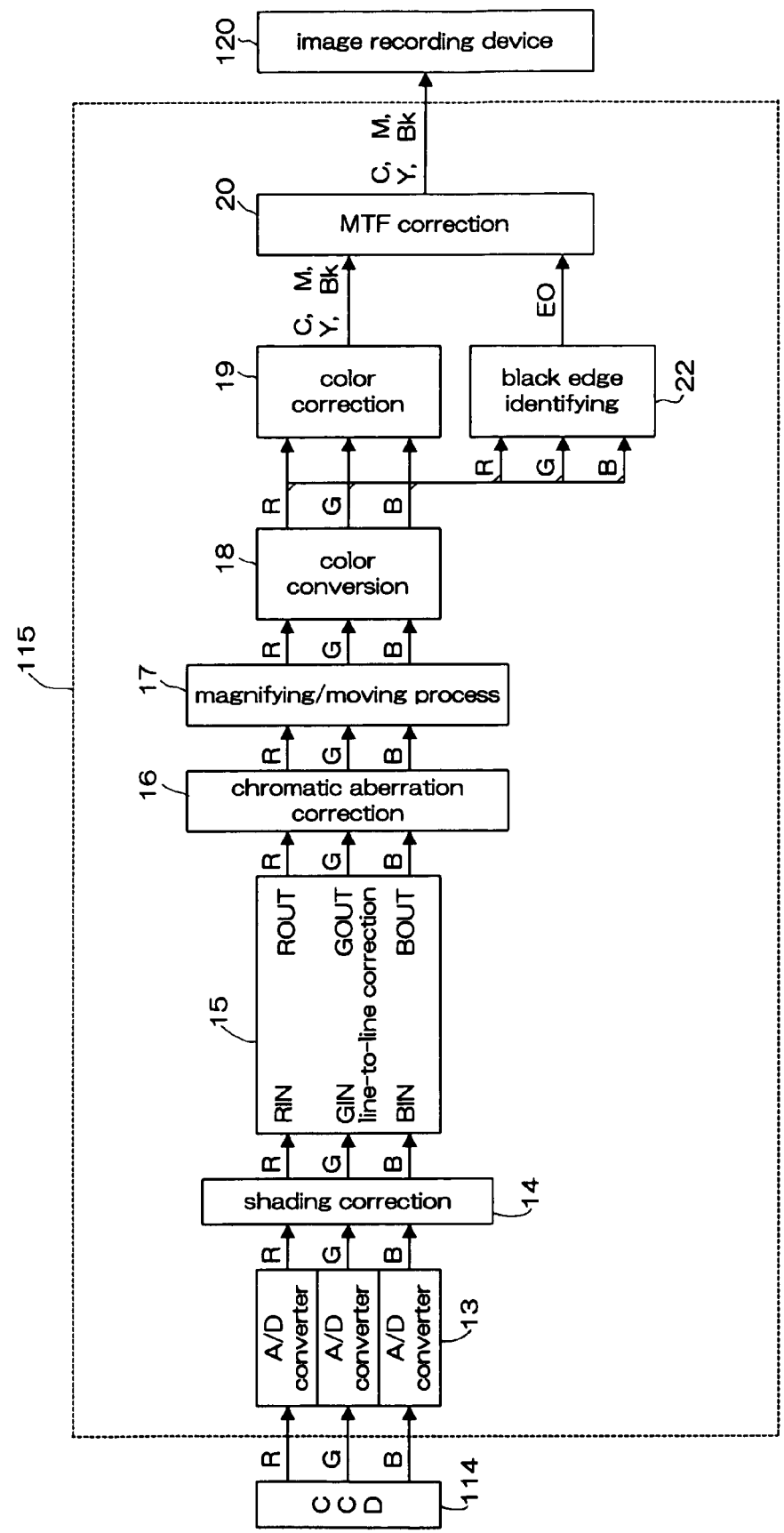
FIG. 1 is a block diagram of the image processing device.

FIG. 1 is a block diagram showing the entire construction of the image processing device 115.

In FIG. 1, the analog signals output from the CCD 114, i.e., the R, G and B color image signals, are input to the A/D converter 13. The A/D converter 13 converts the R, G and B color image signals, which are analog signals, into R, G and B color image data comprising eight-bit digital data (darkness data having 256 gradation levels) The R, G and B color image data thus obtained undergoes shading correction in the shading correction unit 14, in which the unevenness in light amount in the main scanning direction is corrected, and is then input to the line-to-line correction unit 15.

The line-to-line correction unit 15 is a circuit that corrects the phase discrepancies among the R, G and B color image signals (data) that are caused due to the positional differences in the R, G and B lines of the CCD 114. Correction is performed by delaying the R and G color image data using a field memory. The R, G and B color image data output from the line-to-line correction unit 15 are corrected for phase discrepancies due to chromatic aberration in the lens system by the chromatic aberration correction unit 16. Furthermore, enlargement or reduction in the main scanning direction is carried out by the magnifying/moving unit 17, which includes a magnification line memory, in accordance with the specified magnification.

The R, G and B color image data output from the magnifying/moving unit 17 is input to the color conversion unit 18, where R, G and B adjustment takes place. The data is then supplied to the color correction unit 19 and the black edge identifying unit 22.

The color correction unit 19 generates CMY (subtractive colors) color image data C (cyan), M (magenta), Y (yellow) and Bk (black) from the RGB (additive colors) color image data. The thus generated color image data C, M, Y and Bk is supplied to the MTF correction unit 20.

The black edge identifying unit 22 identifies a black character or black line edges (black edges), as explained in the Description of the Related Art, and supplies a determination signal EO to the MTF correction unit 20. However, the black edge identifying unit 22 of this embodiment achieves a higher determination accuracy by improving on the conventional construction. The details of this improvement are explained below.

The MTF correction unit 20 carries out image processing such as edge enhancement and smoothing on the areas identified as black edge areas based on the determination signal EO from the black edge identifying unit 22, and outputs generated image data to the image recording device 120.

Figure 2:
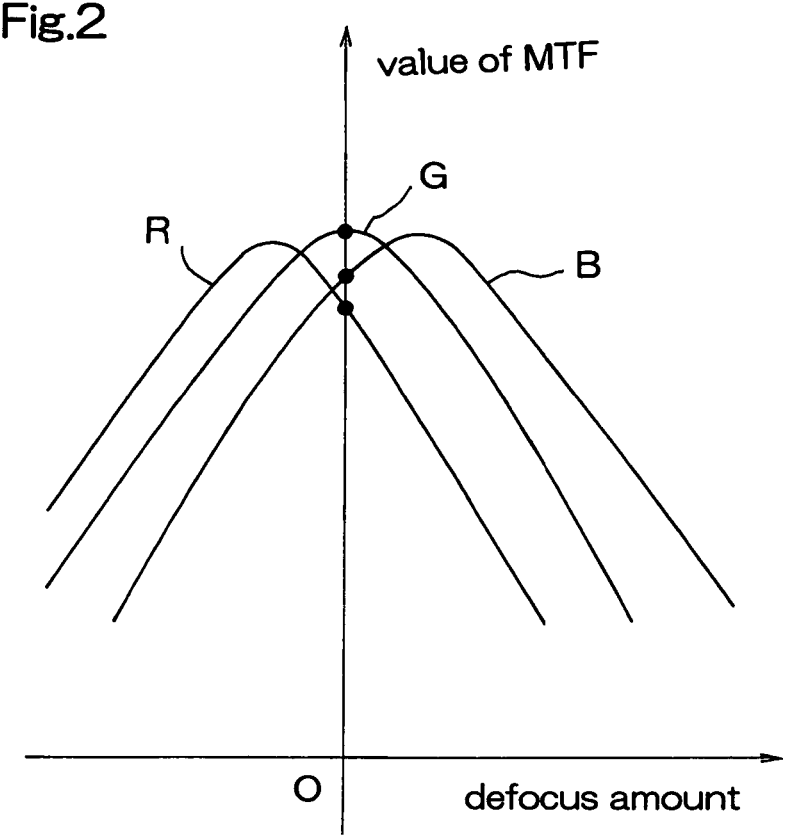
FIG. 2 is a drawing showing the manner in which differences occur among R, G and B MTF curves due to aberrations in the optical system.

FIG. 2 shows the manner in which differences occur among the R, G and B MTF (optical transmission function) curves due to aberrations in the optical system. When a black image is read, ideally the R, G and B MTF curves match each other, but in fact, each of the R, G and B MTF curves relative to the defocus amount of the optical system (the degree to which the optical system is out of focus) shifts due to the differences among the R, G and B spectral wavelengths. Consequently, the optimal image plane position differs for R, G and B, respectively. When the optical system is focused at a prescribed position (the zero defocus position in FIG. 2, for example), differences in the R, G and B MTF curves result.

The basic operation of the line-to-line correction unit 15 and the manner in which a compromised R, G, B balance results from this operation will now be explained with reference to FIGS. 3 through 5.

Figure 3:
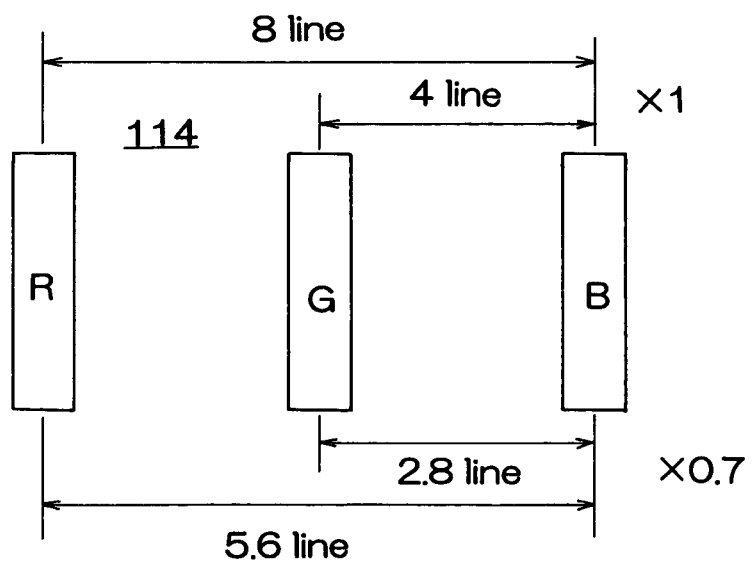
FIG. 3 is a drawing showing positional differences among the R, G and B lines of a CCD.
Figure 4:
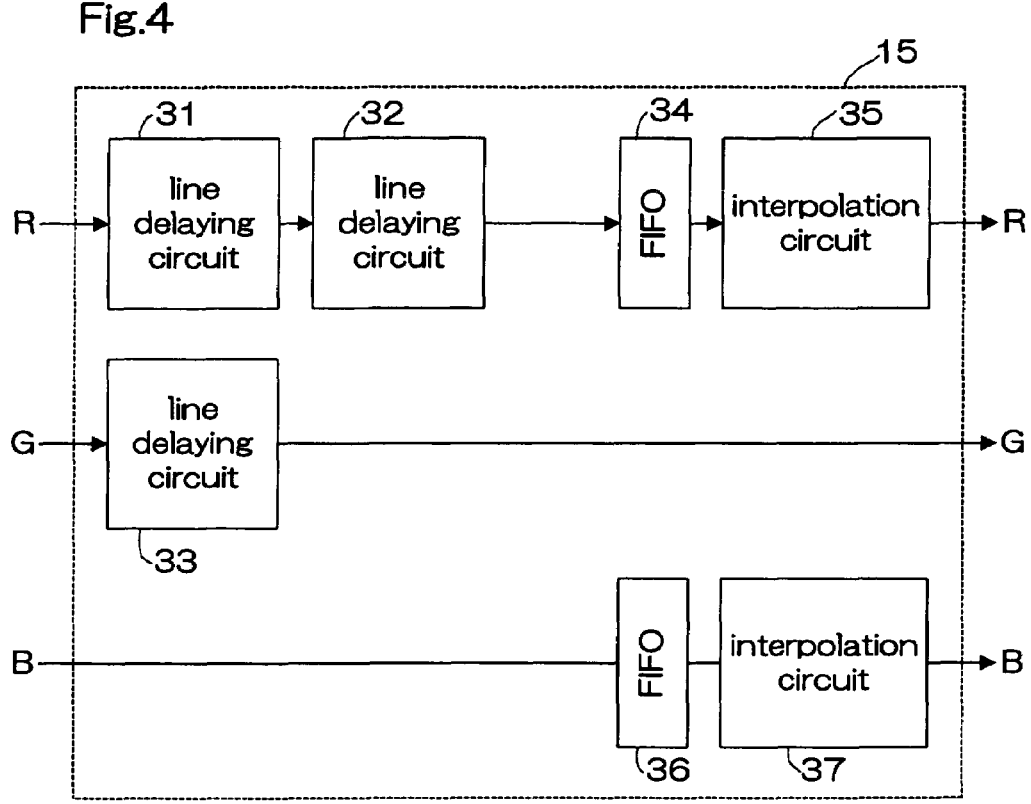
FIG. 4 is a block diagram showing the internal construction of the line-to-line correction unit.
Figure 5:
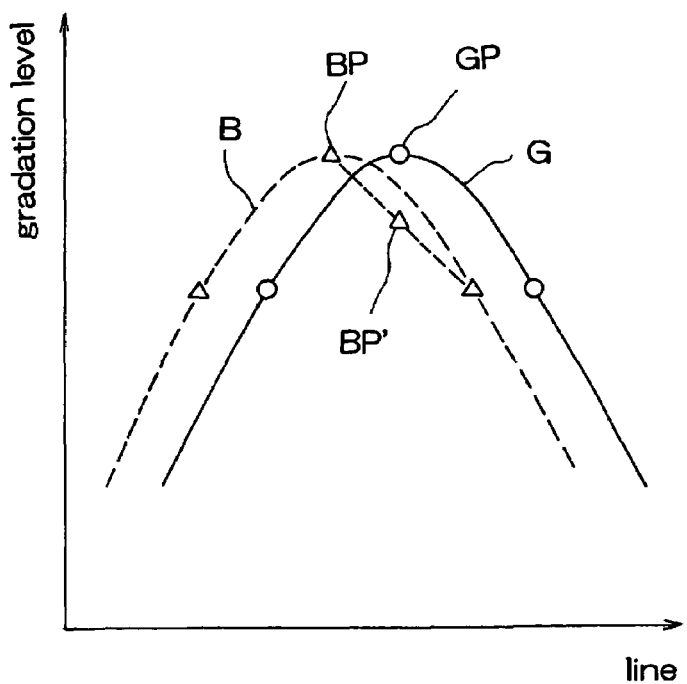
FIG. 5 is a drawing showing in a simplified fashion the phenomenon in which the B data peak drops and a difference is created from the G data peak through interpolation.

FIG. 3 shows the different positions of the R, G and B lines of the CCD 114, and FIG. 4 is a block diagram showing the internal construction of the line-to-line correction unit 15. FIG. 5 shows in a simplified fashion the phenomenon in which, for example, the B data peak BP drops to the level of BP' due to interpolation, and a difference between it and the G data peak GP arises.

The CCD 114 comprises R, G and B pixel lines placed at a prescribed pitch in the secondary scanning direction, as shown in the simplified drawing of FIG. 3. This pitch is equivalent to four lines where no reduction or enlargement is used. Ordinarily, because the original document is scanned in the order of R, G and B, G signals are delayed by four lines and B signals are delayed by eight lines relative to the R signals.

The line-to-line correction unit 15 is a circuit that corrects the phase discrepancies among the R, G and B color image signals that are caused by the different positions of the R, G and B lines of the CCD 114. In the example above, if the G signals are delayed by four lines and the R signals are delayed by eight lines relative to the B signals, the phases of the R, G and B signals will match. The line delaying circuits 31 through 33 shown in FIG. 4 are responsible for this delay.

However, where the magnification is not an integer value, the signals must be delayed not by an exact number of lines but by a number of lines that includes decimal fractions. For example, as shown in FIG. 3, where the magnification is 0.7, the G signals are delayed by 2.8 lines and the B signals are delayed by 5.6 lines relative to the R signals. Where the signals are delayed by a number of lines that includes decimal fractions, as in this example, the delay by the decimal fraction component of the number of lines is performed separately from the delay by the integer component of the number of lines, based on interpolation.

For example, where the magnification is 0.7, as in FIG. 3, the G signals must be delayed by 2.8 lines relative to the B signals. In other words, data delayed 2.8 lines must be generated through interpolation using data delayed by 2 lines and data delayed by 3 lines. In actuality, in order to avoid changing the G signals, which tend to stand out, due to the interpolation, interpolation is performed on the R signals where decimal fractions are concerned using the G signals as the reference. The FIFO 36 and interpolation circuit 37 in FIG. 4 are responsible for this interpolation. The FIFO 36 is a one-line delaying circuit.

Similarly, data delayed by 5.6 lines is generated for the B signals by means of interpolation using data delayed by 5 lines and data delayed by 6 lines. In actuality, interpolation is performed by the FIFO 34 and the interpolation circuit 35 using the G signal as the reference where decimal fractions are concerned.

Using interpolation as described above, the peaks for the R signal and B signal, which undergo interpolation, drop relative to the peak for the G signal (the reference signal), which does not undergo interpolation. FIG. 5 shows a sample comparison between G signals and B signals. It is seen from the drawing that the B signal peak BP drops to BP' due to interpolation with the adjacent line, resulting in a difference in level from the G signal peak GP, for which no interpolation takes place. This phenomenon is marked by black lines.

Figure 6:
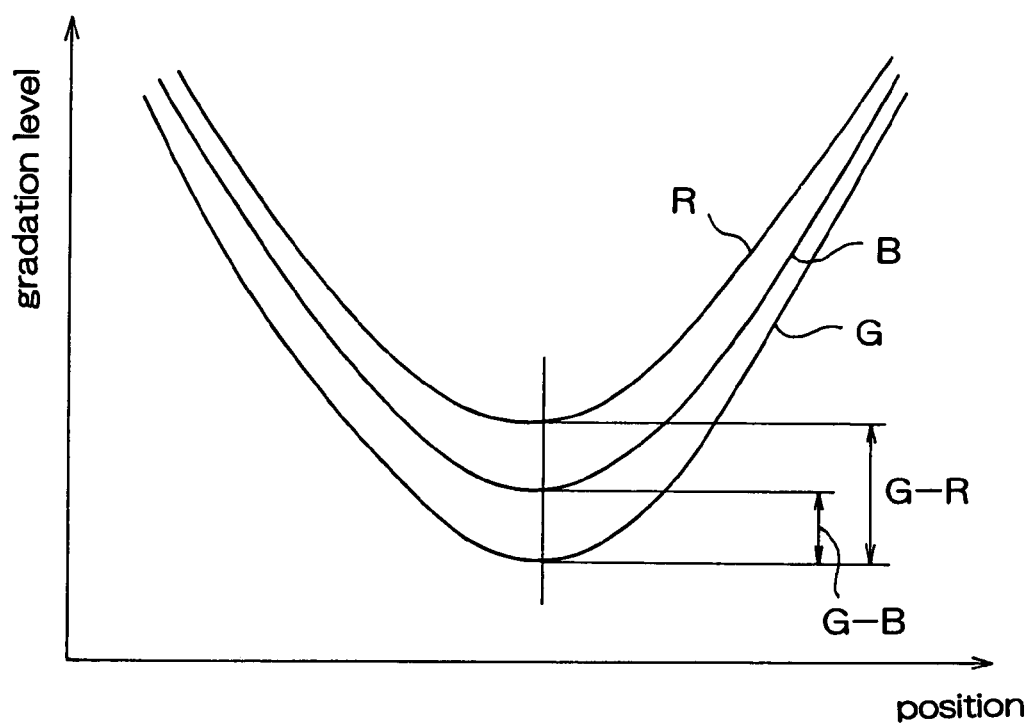
FIG. 6 is a drawing showing the manner in which the balance among the R, G and B output values is compromised by the influence of aberrations in the optical system and of decimal fraction interpolation in line-to-line correction.

As described above, the R, G and B output balance is compromised due to an aberration in the optical system and the decimal fraction interpolation in the line-to-line correction. The manner in which this occurs is shown in FIG. 6. In other words, in image data in which a black character or black line is read, while equal output gradation levels should be obtained for R, G and B, different gradation levels are output for R, G and B, as shown in FIG. 6.

As described above, black character identification is made conventionally using the method in which the difference between the largest value and the smallest value among R, G and B is deemed the saturation value (saturation information), and the image is identified as a black character if the saturation value is smaller than a threshold value. However, due to the factors described above, where the difference between the largest value and the smallest value among R, G and B (G–R) is not zero or near zero but is relatively large as in FIG. 6, black character identification is difficult even if a black character or black line is read. In other words, it is necessary to use a large threshold value, which is compared with the saturation value, in order to carry out black character or black line identification in a case such as that shown in FIG. 6, but in this case the likelihood that non-black characters and lines would also be identified as black characters or lines would increase. Therefore, the black edge identifying unit 22 that performs black character identification in this embodiment uses the following construction in order to minimize erroneous identification and increase identification accuracy.

Figure 7:
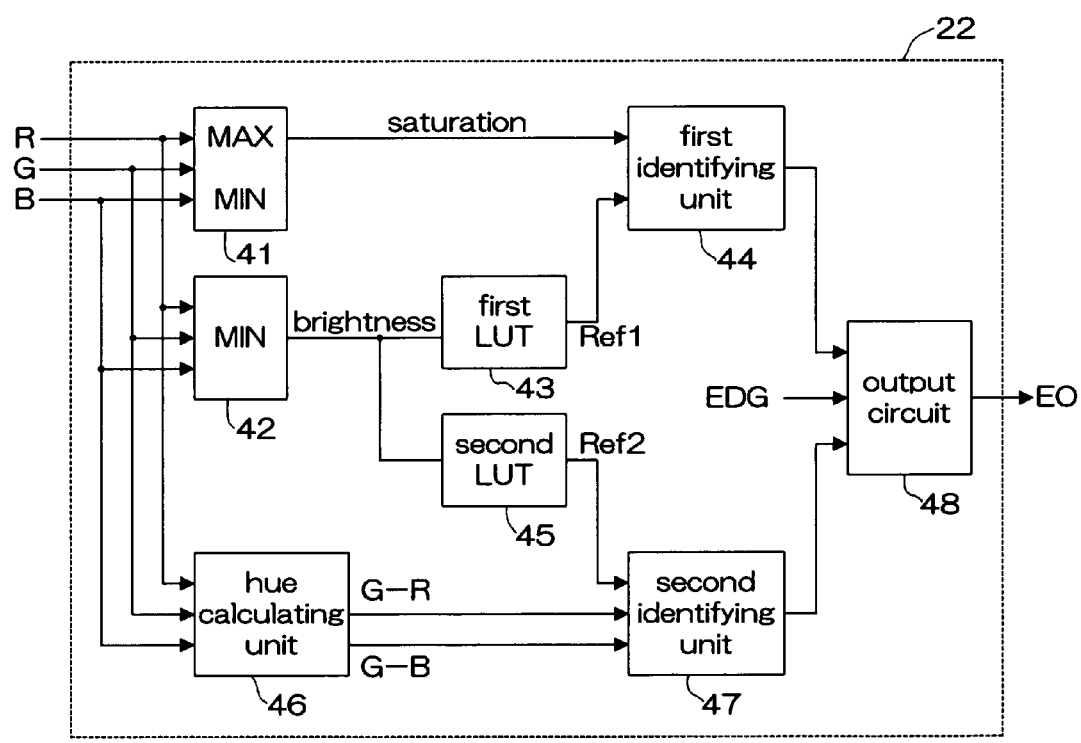
FIG. 7 is a block diagram showing the internal construction of the black edge identifying unit.

FIG. 7 is a block diagram showing the internal construction of the black edge identifying unit 22. The black edge identifying unit 22 includes a saturation calculating circuit 41 comprising a means to obtain saturation information, a brightness calculating circuit 42 comprising a means to obtain brightness information, first and second look-up tables (LUT) 43 and 45, first and second identifying units 44 and 47, a hue calculating unit 46 and an output circuit 48.

Figure 8:
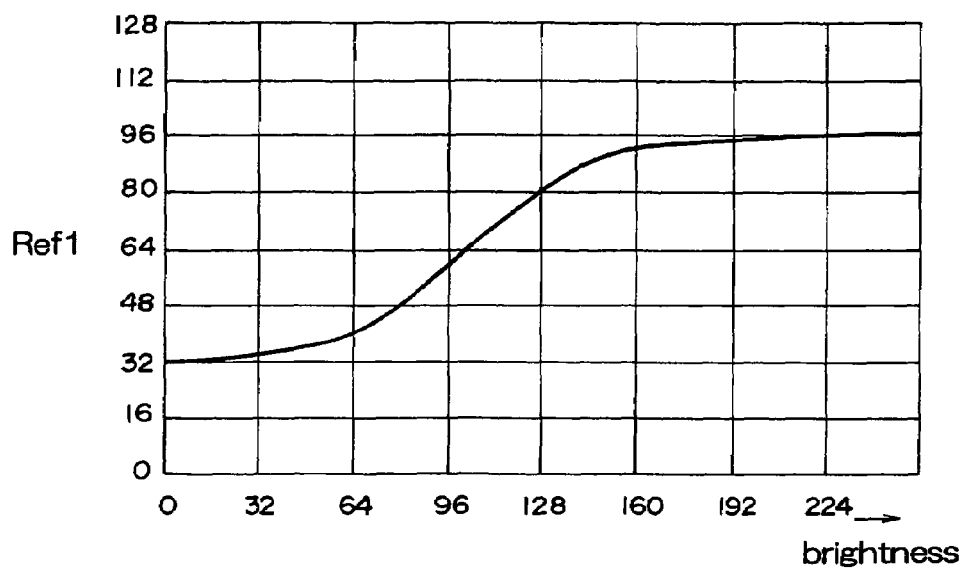
FIG. 8 is a drawing showing an example of the conversion characteristic in the first look-up table.

The difference between the largest value and the smallest value of the R, G and B signals input to the black edge identifying unit 22 is calculated by the saturation calculating circuit 41, and the saturation value is output. G–R shown in FIG. 6 comprises this saturation value. The brightness calculating circuit 42 calculates the smallest value among the R, G and B signals and outputs it as the brightness value. A threshold value Ref1 corresponding to this brightness value is sought by means of the first LUT 43 and is supplied to the first identifying unit 44. The first identifying unit 44 compares the saturation value from the saturation calculating circuit 41 and the threshold value Ref1 from the first LUT 43, and where the saturation value is smaller than the threshold value Ref1, it determines that the image is a black character. This sequence is the same as the conventional black character identifying method. The first LUT 43 has a conversion characteristic in which the larger the brightness value, which is the input value, the larger the threshold value Ref1, which is the output value, as shown in FIG. 8, for example.

Figure 9:
FIG. 9 is a drawing showing an example of the conversion characteristic in the second look-up table.

The black edge identifying unit 22 of this embodiment also has a second LUT 45, a hue calculating unit 46 and a second identifying unit 47, in addition to the conventional construction. The hue calculating unit 46 calculates the hue signals G–R and G–B from the R, G and B signals. The hue signals G–R and G–B are supplied to the second identifying unit 47. The second LUT 45 outputs a threshold value Ref2 corresponding to the brightness value to the second identifying unit 47 in the same manner as the first LUT 43. The second LUT 45 has a conversion characteristic as shown in FIG. 9, for example. However, an appropriate conversion characteristic is set for the second LUT 45 depending on such characteristics as aberration in the optical system of the entire system (such as the digital color copying machine, for example).

The second identifying unit 47 determines whether the image is a true black character or pseudo-black character (dark green area, for example) by comparing the hue signals G–R and G–B with the threshold value Ref2. An appropriate algorithm is specified for this determination depending on the system characteristics as well. Several examples are shown below.

As a first example, suppose a situation in which the R, G and B output gradations have the characteristics shown in FIG. 6 when a black character is read. In this case, in order for the first identifying unit 44 to identify the image as a black character, the threshold Ref1 must be set to be larger than the saturation value (G–R).

Figure 10:
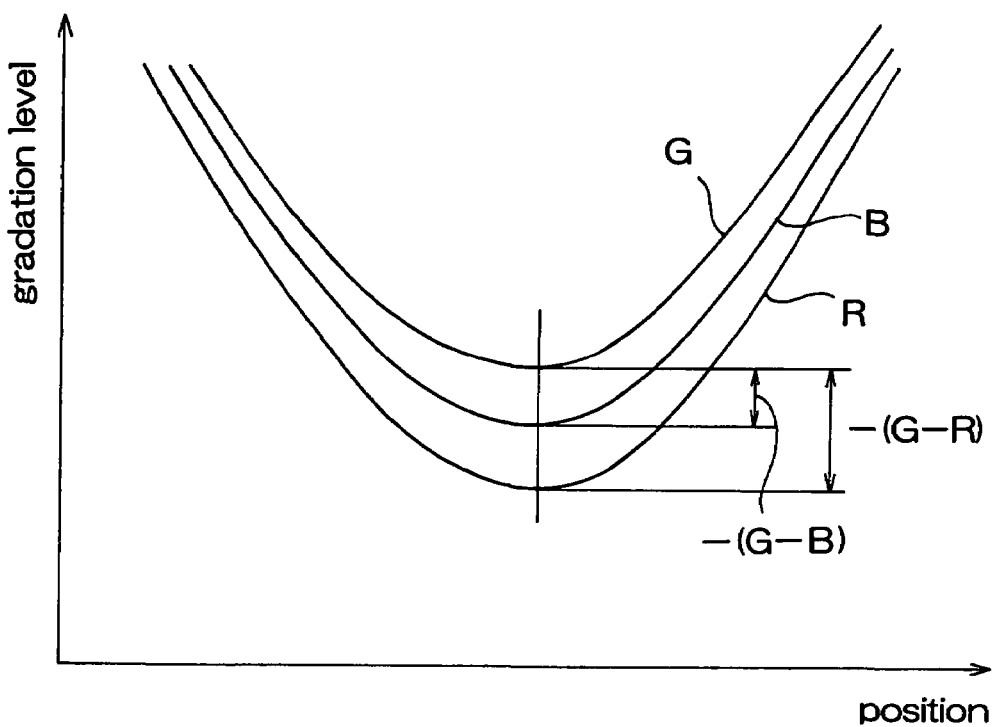
FIG. 10 is a drawing showing the R, G and B output gradation when a dark green line in the first example is read.

On the other hand, suppose the R, G and B gradations are as shown in FIG. 10 when a dark green line is read using the same system. Compared with the characteristics shown in FIG. 6, the G and B values are larger than the R values, and the order of R, G and B is reversed in FIG. 10 from FIG. 6. Therefore, if the hue signals G–R and G–B are positive in FIG. 6, the hue signals G–R and G–B are negative in FIG. 10.

However, the difference between the largest value and the smallest value (R–G) in FIG. 10 is almost the same as the difference between the largest value and the smallest value (G–R) in FIG. 6. Therefore, the first identifying unit 44 erroneously identifies the image as a black character when this dark green line is read. In other words, the first identifying unit 44 alone, which determines whether or not the image is a black character based on the saturation value, i.e., the difference between the largest value and the smallest value, is not capable of differentiating the situation of FIG. 10 from that of FIG. 6.

In this embodiment, the second identifying unit 47 compares the hue signals G–R and G–B with the threshold value Ref2, and therefore the situation in FIG. 6 in which the image is a true black character may be differentiated from the situation in FIG. 10 in which the image is pseudo-black character (dark green line). In other words, as described above, because while the hue signals G–R and G–B are both positive in FIG. 6, the hue signals G–R and G–B are both negative in FIG. 10, if the threshold value Ref2 is specified as '0', for example, the situation in FIG. 6 may be differentiated from the situation in FIG. 10.

In the example above, the second identifying unit 47 outputs a signal indicating that the image is a pseudo-black character (not a true black character) unless the hue signals G–R and G–B are both positive. The signals from the first identifying unit 44 and the second identifying unit 47 are input to the output circuit 48. The output circuit 48 determines that the image is a true black character when the output from the first identifying unit 44 indicates that the image is a black character and the output from the second identifying unit 47 indicates that the image is not a pseudo-black character. Further, a logical product is calculated based on these signals as well as on a signal EDG that indicates that the image comprises edges, and the output circuit 48 outputs a signal EO indicating whether the image comprises black edges.

Figure 11:
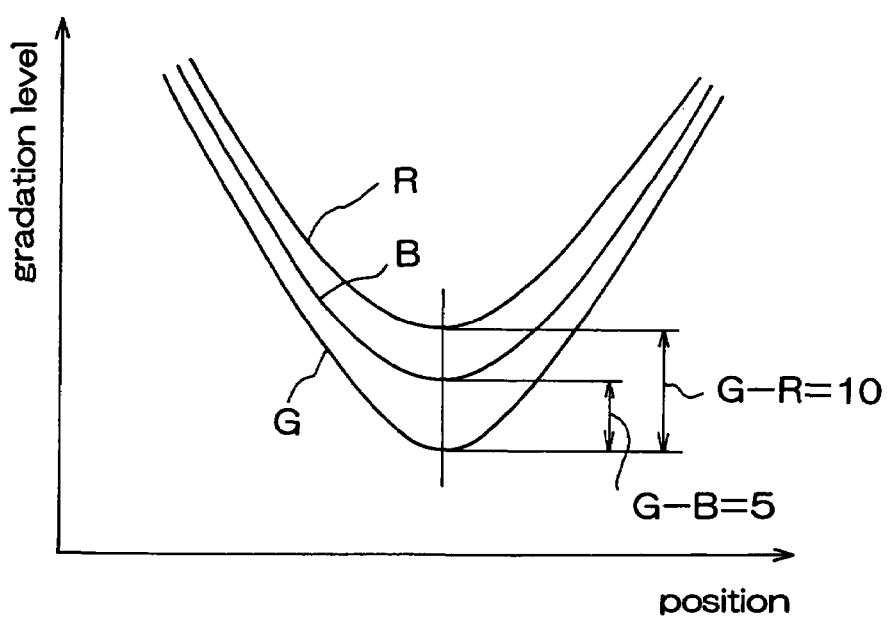
FIG. 11 is a drawing showing the R, G and B output gradation when a black character in the second example is read.

As a second example, suppose a case in which the R, G and B output gradations have the characteristics shown in FIG. 11 when a black character is read using a different system. In this case, in order for the first identifying unit 44 to identify the image as a black character, it is necessary that the threshold value Ref1 be set to be larger than the saturation value (G–R=10).

Figure 12:
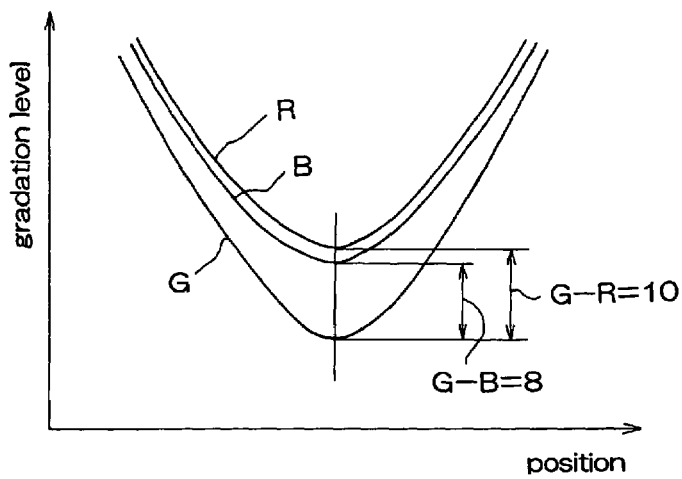
FIG. 12 is a drawing showing the R, G and B output gradation when a dark blue line in the second example is read.

On the other hand, if the R, G and B output gradations are as shown in FIG. 12 when a dark blue line is read using the same system, in comparison with the characteristics in FIG. 11, while the G and R values are not different, the B values are larger, resulting in an increase of the hue signal G–B from 5 to 8.

However, the difference between the largest value and the smallest value (G–R) in FIG. 12 is the same as the difference between the largest value and the smallest value (G–R) in FIG. 11, or in other words, 10. Therefore, the first identifying unit 44 erroneously identifies the image as a black character when this dark blue line is read. In other words, the first identifying unit 44 alone, which determines whether or not the image is a black character based on the saturation value comprising the difference between the largest value and the smallest value, cannot differentiate the situation of FIG. 11 from the situation of FIG. 12.

In this embodiment, the second identifying unit 47 compares the hue signals G–R and G–B with the threshold value Ref2, and therefore the situation in FIG. 11 in which the image is a true black character may be differentiated from the situation in FIG. 12 in which the image is a pseudo-black character (i.e., a dark blue line). In other words, if the threshold value Ref2 is set to be '7', for example, the two situations may be differentiated from each other based on the fact that while the difference between the hue signals G–B=5 and the threshold value Ref2=7 is negative at –2 in the situation of FIG. 11, the difference between the hue signal G–B=8 and the threshold value Ref2=7 is positive at 1 in the situation of FIG. 12. In either situation, the hue signal G–R is 10 and the difference between it and Ref2=7 is positive at 3.

In the example explained above, the second identifying unit 47 outputs a signal that indicates that the image is a pseudo-black character (not a true black character) when the hue signal G–R is smaller than the threshold value Ref2 and the hue signal G–B is larger than the threshold value Ref2. The signals from the first identifying unit 44 and the second identifying unit 47 are input to the output circuit 48. When the output from the first identifying unit 44 indicates that the image is a black character and the second identifying unit 47 indicates that the image is not a pseudo-black character, the output circuit 48 determines that the image is a true black character. Further, a logical product is calculated based on these signals as well as on a signal EDG that indicates that the image comprises edges, and the output circuit 48 outputs a signal EO indicating whether the image comprises black edges.

Figure 13:
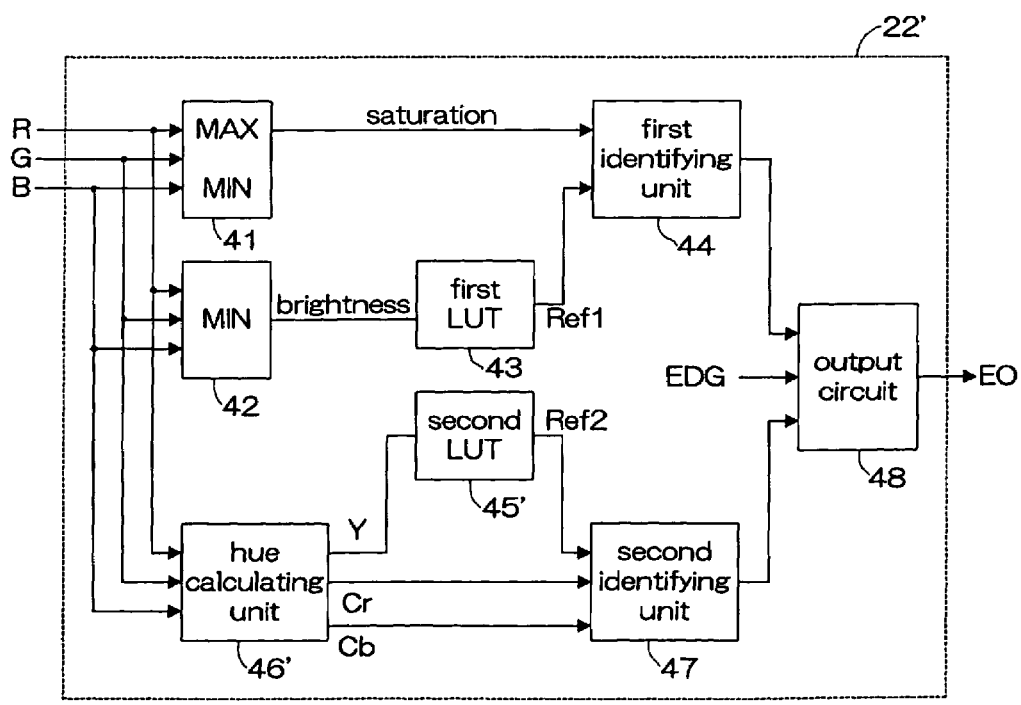
FIG. 13 is a block diagram showing the internal construction of the black identifying unit of another embodiment.

FIG. 13 is a block diagram of black edge identifying unit 22' having a slightly different construction. In this construction, the hue calculating unit 46' outputs color difference signals Cr and Cb and a brightness signal Y. These color difference signals Cr and Cb may be used as the hue signals G–R and G–B described above. In addition, the brightness signal Y is used as the input to the second LUT 45' in this construction. The rest of the construction is the same as that shown in FIG. 7.

In yet another embodiment, the hue information may be used to contribute to the black character identification performed by the first identifying unit by changing the conversion characteristic of the first LUT 43 (i.e., selecting one from among multiple conversion characteristics), using the hue signals G–R and G–B output from the hue calculating unit 46 or the color difference signals Cr and Cb output from the hue calculating unit 46'. In this case, the second identifying unit 47 is not required.

Using the embodiment explained above, black edge identification is performed using not only the brightness information and saturation information of the edges but also the hue information, and therefore black edges and edges of a color close to black may be easily differentiated from each other, resulting in more accurate black edge identification.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. An image processing apparatus comprising:
    a receiver which receives image data which is obtained by means of reading an original document by an image sensor;
    an extracting portion which extracts an edge portion using the received image data;
    an obtaining portion which obtains brightness information, saturation information and hue information with respect to the edge portion;
    a first determining portion which determines whether or not the edge portion is black edge based on the brightness information and saturation information;
    a second determining portion which determines whether or not the edge portion is a pseudo-black edge based on the hue information; and
    a third determining portion which determines that the edge portion is a black edge when the edge is determined as a black edge by the first determining portion and not as a pseudo-black edge by the second determining portion.

2. An image processing apparatus as claimed in claim 1, wherein said second determining portion compares a threshold value obtained based on the brightness information with the hue information, and determines whether or not the edge portion is a pseudo-black edge based on a result of the comparison.

3. An image processing apparatus as claimed in claim 1, further comprising:
    an image processing portion which applies a predetermined process to the black edge determined by the third determining portion.

4. An image processing apparatus as claimed in claim 1, wherein the image data has R, G, and B data.

5. An image forming apparatus comprising:
    an image sensor which reads a original document;
    an extracting unit which extracts an edge portion using the image data from the image sensor;
    an obtaining unit which obtains brightness information, saturation information and hue information with respect to the edge portion;
    a first determining unit which determines whether or not the edge portion is black edge based on the brightness information and saturation information;
    a second determining unit which determines whether or not the edge portion is a pseudo-black edge based on the hue information; and
    a third determining unit which determines that the edge portion is a black edge when the edge is determined as a black edge by the first determining unit and not as a pseudo-black edge by the second determining unit.

6. An image forming apparatus as claimed in claim 5, wherein the image data has R, G, and B data.

* * * * *